Patented Dec. 26, 1922.

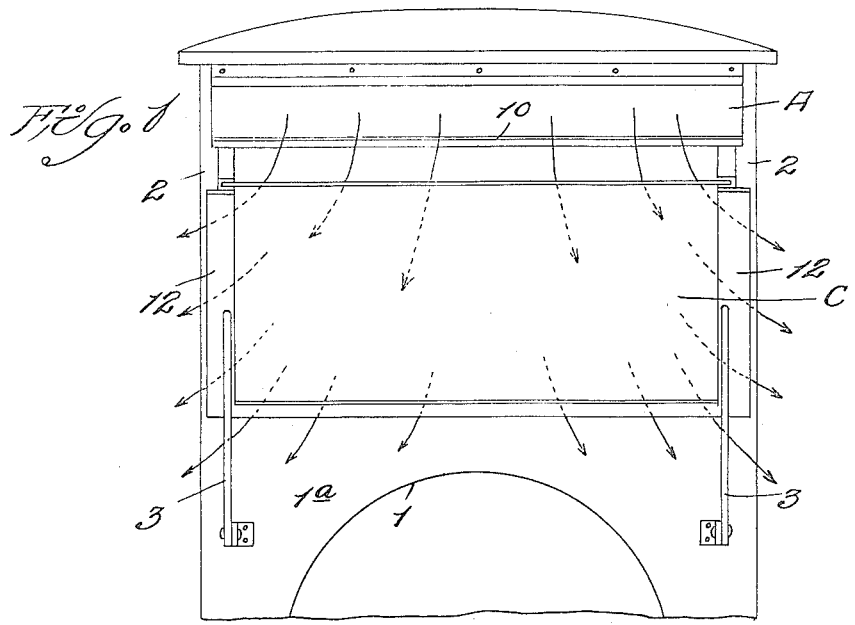
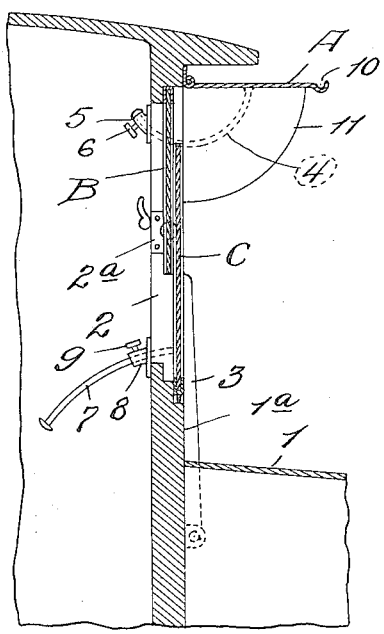
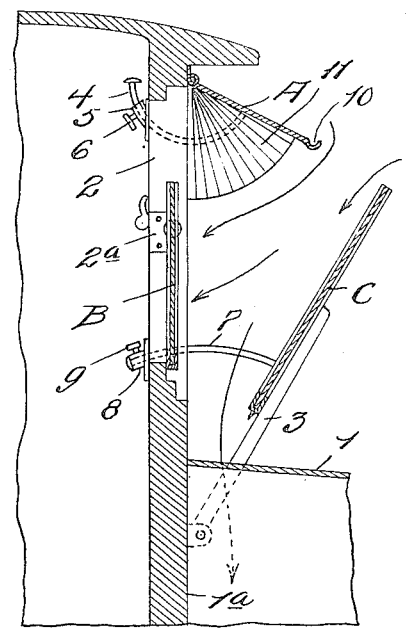

1,439,949

UNITED STATES PATENT OFFICE.

WILLIAM DE F. CROWELL, OF ST. LOUIS, MISSOURI.

CLEAR-VISION WINDSHIELD FOR VEHICLES.

Application filed May 10, 1920. Serial No. 380,283.

*To all whom it may concern:*

Be it known that I, WILLIAM DE F. CROWELL, a citizen of the United States, residing at St. Louis, Missouri, have invented a certain new and useful Improvement in Clear-Vision Windshields for Vehicles, of which the following is a full, clear, and exact description, such as will enable others skilled in the art to which it appertains to make and use the same.

This invention relates to clear vision wind shields for vehicles.

One object of my invention is to provide a clear vision wind shield of the downdraft type which is equipped with a novel means for creating a downward circulation of air in proximity to the clear vision slot of the shield.

Another object is to provide an efficient clear vision wind shield of simple construction that can be applied easily to various kinds of vehicles, such as automobiles, street cars, etc.

To this end I have devised a wind shield that comprises a top member and a bottom member arranged or capable of being arranged in such a position with relation to each other that a transversely-disposed clear vision slot is formed between the adjacent horizontal edges of said members, and an air deflector arranged or capable of being arranged in front of said bottom member in such a position that the forward movement of the vehicle on which the wind shield is used will create a suction or partial vacuum at the rear side of said air deflector of sufficient intensity to suck air, dust, rain or the like downwardly and laterally away from the clear vision slot of the shield, thereby providing an unobstructed view for the operator of the vehicle in inclement weather without liability of rain, dust, etc., blowing into the vehicle. It is essential that the top member of the shield be so disposed with relation to the bottom member and the air deflector that the lower edge of said top member terminates above the upper edges of said bottom member and air deflector and at a point intermediate said parts, and it is also essential that the space between the bottom member and the air deflector be open at its bottom or lower side and also at both ends so that when the vehicle is traveling forwardly a suction or partial vacuum will be created at the rear side of the air deflector by the air which strikes the front side of said air deflector and that escapes laterally at the ends of said deflector and downwardly from the lower edge of said deflector. The various members or parts of the shield above referred to can be constructed in various ways; they can be disposed at various angles or in various planes and they can be stationary or adjustably mounted. I prefer to construct the shield so that the bottom member and the air deflector can be used to form a wall that serves as a closure for the front of the vehicle or compartment on which the shield is used as claimed broadly in my pending application Serial No. 380,282, filed May 10, 1920, and the top member can be used as a sun shade or a rain visor to prevent rain from beating onto the upper portion of said wall.

Figure 1 of the drawings is a front elevational view of a wind shield constructed in accordance with my present invention.

Figure 2 is a vertical sectional view of said shield, illustrating the bottom member and the air deflector arranged in position to form a closure for the front of the vehicle; and Figure 3 is a vertical sectional view, illustrating the various members of the shield in the positions they occupy when the clear vision slot of the shield is in use.

Referring to the drawings, which illustrate the preferred form of my invention, A designates the top member of the shield, B the bottom member and C the air deflector. When the clear vision slot of the shield is in use the members A, B and C occupy the positions shown in Figure 3, namely, the air deflector C is arranged some distance in advance of the bottom member B and the top member A is so arranged with relation to the members B and C that the lower edge of said top member terminates intermediate the members B and C and far enough above the upper edges of said members B and C to form a horizontally-disposed clear vision slot that provides an unobstructed view for the operator in charge of the vehicle. The air deflector C is preferably arranged in a forwardly-inclined position, and when the wind shield is used on an automobile, as herein illustrated, the air deflector C is arranged high enough above the cowl 1 of the automobile to permit air to escape downwardly from the space between the members B and C. The space between said members B and C is also open at its ends so as to permit air to circulate laterally through said space and escape at the ends of same. When the vehicle is traveling forwardly the air that strikes the front side of the air deflector C escapes laterally at the ends of said deflector and also downwardly at the lower edge of said deflector, the air that escapes at the ends of the deflector C rushing rearwardly past the open ends of the space behind said deflector, thus tending to suck air out through the ends of said space, and the air that is deflected downwardly by the member C against the portion of the front 1ª of the vehicle arranged below the member B tending to suck the air downwardly from the space at the rear side of the member C. The result is, that a circulation is created in the space between the members B and C, downwardly and also laterally towards the ends of said space, as indicated by the arrows in the drawings. This circulation produces a suction at the rear side of the member C of sufficient intensity to prevent dust, rain or the like from blowing inwardly through the clear vision slot of the shield.

In the form of my invention herein illustrated the bottom member B of the shield is revolubly mounted on a supporting structure which may be formed by the side posts 2 of the vehicle, and the air deflector C is carried by pivotally mounted arms 3 that can be swung forwardly into the position shown in Figure 3 when the clear vision slot of the shield is in use, or rearwardly into the position shown in Figure 2, so as to arrange the member C in substantially parallel relation to the side posts 2. The member B is mounted in bearings 2ª on the side posts 2 in such a manner that said member can be revolved upwardly from the position shown in Figure 1 into the position shown in Figure 2. When the members B and C are arranged in the position shown in Figure 2 they co-operate with each other to form a solid or imperforate closure or protecting wall for the front of the vehicle. When the clear vision slot of the shield is not in use, the top member A of the shield can be swung upwardly into the position shown in Figure 2, so as to serve as a rain visor or as a sun shade, in case the member A is formed of opaque material. The top member A of the shield herein illustrated is pivotally connected at its upper edge to a cross piece that extends between the side posts 2 of the vehicle, and means of any preferred form is provided for holding the top member A in adjusted position, such, for example, as curved arms 4 on the member A that project rearwardly through guides 5 on the side posts equipped with thumb screws or other suitable clamping devices 6. The air deflector C of the shield is also provided with rearwardly-projecting arms 7 that pass through guides 8 on the side posts equipped with clamping devices 9. If desired, the air deflector C can be provided at its ends with laterally-projecting extensions 12, so as to increase the suction produced at the rear side of the member C by the air which escapes rearwardly at the ends of said member. I wish it to be understood, however, that it is immaterial, so far as my invention is concerned, what means is employed for adjusting the members A and C and holding said members in adjusted position, and it is also immaterial whether the member A is formed of opaque or transparent material. Preferably, the member A is provided at its lower edge with a gutter 10 so as to collect and carry away any water that drains down the front side of said member, and collapsible side closures 11, preferably consisting of pieces of fabric provided with accordian pleats, are connected to the ends of the member A and to the side posts 2, so as to prevent rain from beating inwardly around the ends of the member A.

A clear vision wind shield of the construction above described is admirably adapted for use on street cars and various other kinds of vehicles, and also on an automobile provided with a relatively low and narrow cowl, due to the fact that such vehicles permit the use of a down-draft to carry rain, dust and the like away from the clear vision slot of the shield. My improved shield is highly efficient, owing to the fact that the suction at the rear side of the air deflector C is created by a circulation laterally and downwardly in the space of the rear side of said air deflector, the shield can be manufactured at a low cost and applied easily, and in addition to providing an unobstructed view for the operator in charge of the vehicle in inclement weather, it enables the front of the vehicle to be completely closed when the clear vision slot is not in use.

Having thus described my invention, what I claim as new and desire to secure by Letters Patent, is:

1. A clear vision down-draft wind shield for vehicles, comprising a transversely-disposed bottom member, an air deflector arranged in advance of said bottom member, a top member whose lower edge terminates at a point intermediate said bottom member and air deflector and above the top edges of same, and means for sustaining said air deflector in such a position with relation to said bottom member and with relation to the vehicle on which the wind shield is mounted that air will escape rearwardly from the bottom edge and from the ends of said air deflector and thus produce a downward and lateral circulation of air in the space behind said air deflector of sufficient intensity to prevent rain, dust, air and the like from blowing inwardly into the vehicle over the top edge of said bottom member, the space between said bottom member and air deflector being open at its lower side and at its ends.

2. A wind shield for vehicles, comprising a top member and a bottom member arranged in such a position with relation to each other that a clear vision slot is formed between said members, an air deflector adapted to be arranged in front of said bottom member so as to form a space open at its lower side and at its ends through which air circulates downwardly and laterally when the vehicle is traveling forwardly, and means for enabling said air deflector and bottom member to be arranged in substantially parallel relation, one higher than the other, so as to form a closure for the front of the vehicle.

3. A wind shield for vehicles, comprising a bottom member, a forwardly-inclined air deflector arranged in advance of said bottom member and combined with same in such a way as to form a space open at its lower side and at its ends through which air is sucked downwardly and laterally by the suction created at the rear side of said deflector by the air which strikes the front side of same when the vehicle is traveling forwardly, an adjustable top member, and means for enabling said air deflector and bottom member to be arranged in substantially parallel relation, one higher than the other, so as to form a closure for the front of the vehicle.

4. A clear vision wind shield for vehicles, comprising a revoluble bottom member, a top member that co-operates with said bottom member to form a clear vision slot, an air deflector arranged in advance of said bottom member and combined with same in such a way as to form a space open at its lower side and at its ends through which air circulates downwardly and laterally at the front side of said bottom member, and means for enabling said air deflector to be retracted and held in substantially parallel relation with said bottom member when the clear vision slot of the shield is not in use.

5. A clear vision wind shield for vehicles, comprising a revoluble bottom member, a top member, a transversely-disposed air deflector arranged in advance of said bottom member when the clear vision slot is in use, said bottom member being adapted to be moved upwardly into a position at the rear of said top member when the clear vision slot of the shield is not in use, and pivotally mounted arms that carry said air deflector and which maintain it in such a position when the clear vision slot is in use that the air which strikes the front side of said deflector will escape rearwardly from the bottom edge and from the ends of said deflector and thus create a downward circulation at the rear side of said deflector, the space between said bottom member and deflector being open at its lower side and at its ends.

6. A clear vision wind shield, comprising a supporting structure, a top member, a bottom member revolubly mounted on said supporting structure and adapted to be arranged either in a lower horizontal plane than said top member or in an elevated position behind said top member, and an adjustable air deflector that is adapted to be arranged within the plane of said supporting structure in substantially parallel relation to said bottom member or in a position in advance of said bottom member so as to form an air circulating space between said bottom member and air deflector which is open at both ends and at its lower side.

7. A clear vision wind shield for vehicles, comprising a supporting structure, a pivotally mounted top member on said supporting structure that projects forwardly and downwardly from same when the clear vision slot of the shield is in use, a bottom member revolubly mounted on said supporting structure, an air deflector that is arranged in a forwardly-inclined position in front of said bottom member when the clear vision slot of the shield is in use, the space between said air deflector and bottom member being open at its lower side and both ends, and pivotally mounted arms to which said air deflector is rigidly connected.

WILLIAM DE F. CROWELL.